(12) United States Patent
Elsom-Cook et al.

(10) Patent No.: US 8,929,821 B2
(45) Date of Patent: Jan. 6, 2015

(54) SHORT RANGE RF MONITORING SYSTEM

(75) Inventors: Mark Elsom-Cook, West Midlands (GB); Steve P Morris, West Midlands (GB)

(73) Assignee: Bigger Than The Wheel Ltd., Binley, Coventry, West Midlands (GB)

( * ) Notice: Subject to any disclaimer, the term of this patent is extended or adjusted under 35 U.S.C. 154(b) by 99 days.

(21) Appl. No.: 13/600,175

(22) Filed: Aug. 30, 2012

(65) Prior Publication Data
US 2013/0059600 A1 Mar. 7, 2013

Related U.S. Application Data

(63) Continuation of application No. 12/989,218, filed as application No. PCT/IB2009/050411 on Apr. 22, 2009.

(30) Foreign Application Priority Data

Apr. 23, 2008 (GB) .................................. 0807436.1

(51) Int. Cl.
| G01S 3/20 | (2006.01) |
| H04B 7/10 | (2006.01) |
| H04W 64/00 | (2009.01) |
| G01S 11/02 | (2010.01) |
| G01S 11/06 | (2006.01) |
| H04W 8/00 | (2009.01) |
| H04W 84/18 | (2009.01) |

(52) U.S. Cl.
CPC ................. *H04W 64/00* (2013.01); *G01S 3/20* (2013.01); *G01S 11/02* (2013.01); *G01S 11/06* (2013.01); *H04W 8/005* (2013.01); *H04W 84/18* (2013.01)
USPC ............ 455/41.2; 342/56; 342/146; 342/147; 342/158

(58) Field of Classification Search
CPC ............ H04W 64/00; G01S 3/00; G01S 3/02; G01S 3/04; G01S 3/14; G01S 3/16; G01S 3/20; G01S 3/38–3/44
USPC ............ 455/41.2, 67.11; 340/539.13, 539.21, 340/568.1
See application file for complete search history.

(56) References Cited

U.S. PATENT DOCUMENTS

| 4,306,240 | A | * | 12/1981 | Yasuda et al. | .................. 342/436 |
| 4,573,212 | A | * | 2/1986 | Lipsky | .......................... 455/282 |
| 4,724,442 | A | * | 2/1988 | King | .............................. 342/434 |
| 4,845,502 | A | * | 7/1989 | Carr et al. | ...................... 342/430 |
| 4,888,593 | A | * | 12/1989 | Friedman et al. | ............. 342/387 |
| 5,003,316 | A | * | 3/1991 | Ostermiller | ................... 342/429 |
| 5,402,132 | A | * | 3/1995 | Hall et al. | ...................... 342/432 |

(Continued)

*Primary Examiner* — Gennadiy Tsvey
(74) *Attorney, Agent, or Firm* — Finnegan, Henderson, Farabow, Garrett & Dunner, LLP

(57) ABSTRACT

A wireless short range radio-frequency master device adapted to create and maintain a portable private network of wireless short range radio-frequency slave devices wherein the master device is configured to detect and register suitable slave devices for a network, and is capable of determining the proximity of any registered slave device with respect to the master device in use, the master device further being adapted to enable a user to define two or more groups of registered slave devices selected from the total number of registered slave devices and to enable a user to select a defined group of such registered slave devices as an active group, thereby forming an active portable private network of wireless short range radio frequency devices comprising the master device and selected registered slave devices within the selected group.

9 Claims, 9 Drawing Sheets

(56) References Cited

U.S. PATENT DOCUMENTS

| | | | |
|---|---|---|---|
| 5,448,248 A * | 9/1995 | Anttila | 342/400 |
| 5,534,872 A * | 7/1996 | Kita | 342/146 |
| 5,898,390 A * | 4/1999 | Oshizawa et al. | 340/988 |
| 5,955,982 A * | 9/1999 | Moulin | 342/22 |
| 5,960,047 A * | 9/1999 | Proctor et al. | 375/347 |
| 6,075,442 A | 6/2000 | Welch | |
| 6,337,628 B2 * | 1/2002 | Campana, Jr. | 340/573.4 |
| 6,469,657 B1 * | 10/2002 | Fox | 342/147 |
| 6,970,090 B1 * | 11/2005 | Sciarra | 340/573.1 |
| 7,300,367 B1 * | 11/2007 | Andol et al. | 473/578 |
| 7,532,901 B1 * | 5/2009 | LaFranchise et al. | 455/456.6 |
| 7,561,895 B1 * | 7/2009 | Hohnstein et al. | 455/524 |
| 7,904,718 B2 * | 3/2011 | Giobbi et al. | 713/172 |
| 2001/0000959 A1 * | 5/2001 | Campana, Jr. | 340/573.1 |
| 2001/0056305 A1 | 12/2001 | Moriya et al. | |
| 2003/0063003 A1 * | 4/2003 | Bero et al. | 340/573.1 |
| 2003/0228846 A1 * | 12/2003 | Berliner et al. | 455/67.11 |
| 2004/0000993 A1 * | 1/2004 | Lu | 340/539.1 |
| 2005/0038574 A1 | 2/2005 | Gila et al. | |
| 2005/0250543 A1 * | 11/2005 | Thermond | 455/562.1 |
| 2006/0044134 A1 * | 3/2006 | Elliott | 340/539.23 |
| 2006/0052112 A1 * | 3/2006 | Baussi et al. | 455/456.1 |
| 2007/0195005 A1 * | 8/2007 | Schantz | 343/876 |
| 2008/0085678 A1 * | 4/2008 | Haug | 455/41.2 |
| 2008/0125040 A1 * | 5/2008 | Kalayjian | 455/41.2 |
| 2008/0198035 A1 | 8/2008 | Ebbe et al. | |
| 2009/0011713 A1 * | 1/2009 | Abusubaih et al. | 455/67.11 |
| 2009/0088230 A1 | 4/2009 | Park | |
| 2009/0111518 A1 * | 4/2009 | Agrawal et al. | 455/557 |
| 2009/0315759 A1 * | 12/2009 | Mak et al. | 342/147 |

* cited by examiner

_US 8,929,821 B2_

SHORT RANGE RF MONITORING SYSTEM

CROSS-REFERENCE TO RELATED APPLICATIONS

This application is a continuation of U.S. application Ser. No. 12/989,218, filed Oct. 22, 2010, now U.S. Publication No. 2011-0098001, and claims the benefit of PCT/IB2009/050411, filed Apr. 22, 2009, which claims the benefit of U.K. Application No. 0807436.1 filed Apr. 23, 2008, now U.K. Patent No. GB 2472547, all of which are incorporated herein by reference in their entireties.

TECHNICAL FIELD

The invention relates to a method and apparatus for monitoring a network of wireless short range radio-frequency devices. In particular, but not exclusively, the invention relates to apparatus for forming a network of items which can be organised in groups and enable a user to determine the presence and/or absence one or more of the items within the network. Additionally, the invention relates to apparatus for enabling determination of the proximity and/or orientation of a device within the network relative to a master device.

BACKGROUND TO THE INVENTION

It is known for two or more wireless short range radio-frequency devices, or Bluetooth (trademark) devices, to form a private network known as a piconet. A piconet comprises, a master device and up to a maximum (according to the Bluetooth standard) of seven active slave devices.

FIG. 1 is an example of the prior art. There is shown a piconet A which will be used as the basis for the embodiment of the invention as described below. The piconet A consists of a master device B, a maximum of seven slave devices C, and RF connections for transfer of information D between the master device B and the slave devices C. In the preferred embodiment the master device B is a known mobile telecommunications device which has a radio-frequency transmitter and receiver that complies to known Bluetooth specifications, but may be any suitable device which has wireless short range radio-frequency capabilities, for example but not limited to a personal portable computer, a watch, a Wibree® transmitter etc. The preferred embodiment of the slave devices C is a Bluetooth tag, but may be any suitable device which has Bluetooth capabilities, for example but not limited to a personal portable computer, mobile phone, a dongle etc. The master device B and slave device C are ordinary Bluetooth devices with the standard two part architecture, comprising the controller E and the Bluetooth stack F. The controller E consists of the hardware such as the Radio Frequency Controller (RF), a link controller (LC) and a link manager (LMP). The Bluetooth stack F consists of the known standard communication protocols, such as L2CAP, RFCOMM, HCI etc. to communicate with the controller E. In a piconet A, the master device B can transmit data D to any slave device C, but a slave device cannot transmit data to another slave device. The slave devices C that form the piconet A are known as active, slave devices C that are known to the master device B, but do not form part of the piconet A are known as inactive or parked.

The use of piconets to form ad-hoc networks to transfer data between devices is well known, however there is currently no example of using a master device to maintain and monitor a portable piconet by measuring the distance between the master and slave devices. The Bluetooth standard does not specify a mechanism for calculating the separation of devices and as such it is impossible to perform a single calculation to calculate the distance between devices in a piconet that will work on all Bluetooth enabled devices. Furthermore, there are no examples of a portable device that is able to determine the bearings of a slave Bluetooth device with respect to the master device. The currently known methods for determining the bearings require triangulation between two or more fixed devices to determine the location of a portable slave device.

SUMMARY OF THE INVENTION

To mitigate at least some of the problems in the prior art there is provided according to an aspect of the invention a wireless short range radio-frequency master device adapted to create and maintain a portable private network of wireless short range radio-frequency slave devices wherein the master device is configured to detect and register suitable slave devices for a network, and is capable of determining the proximity of any registered slave device with respect to the master device in use, the master device further being adapted to enable a user to define two or more groups of registered slave devices selected from the total number of registered slave devices and to enable a user to select a defined group of such registered slave devices as an active group, thereby forming an active portable private network of wireless short range radio frequency devices comprising the master device and selected registered slave devices within the selected group.

In a further aspect of the invention there is also provided a system for the creation of and maintaining of a portable private network of wireless short range radio-frequency devices, comprising a master device as set out in any of the above claims and one or more slave devices, that are enabled to form a portable private network when activated by the master device.

In yet another aspect of the invention there is provided a method of creating and maintaining a portable private network of wireless short range radio-frequency device, comprising a master device and one or more slave devices, the method comprising the steps of; detection of the slave devices by the master device, registration of the slave device to the master device and assigning the slave device to one or more groups, selection and activation of a group of slave devices, the group defining the active slave devices that form the portable private network.

In a further aspect of the invention there is provided a method for determining the separation between at least two portable wireless short range radio-frequency devices, comprising a master device and one or more slave devices the method comprising the steps of; detection of one or more slave devices within communication range of the master device, measurement of the received and transmitted signal strength between the master and slave devices, determination of the range of the slave devices with respect to the master device based on the measured signal strength, where the signal strength is determined by a combination of one or more of the following; a measure of the strength of the master transmitted signal as received by a slave device, a ratio of the strength of the signal received by the slave device to the strength of the signal transmitted by the master device, a ratio of the strength of the signal received by the master device to the strength of the signal transmitted by the slave device, a determination of the threshold of detection of a slave device by variation of the strength of the master transmitter signal, a determination of the path loss rate as decibel loss of signal strength between the master and slave devices, a determination of the bit error rate by measure of number of packets of data lost between the master device and a slave device, a calibration of the change in signal strength received by a slave device due to a change in the separation between the master and slave devices, by measurement of the strength of the signal received by the slave device from the master device at one or more known separations from the master device, a calibration of the slave device transmitter and receiver by querying the device for manufacturer information, comparing the response to a list of known previously calibrated devices.

In another aspect of the invention there is provided a system for determining the distance between at least two portable wireless short range radio-frequency devices, comprising a master device and one or more slave devices, the master device being configured to detect one or more slave devices within communication range of the master device, the master device being further configured to measure the received and/or transmitted signal strength between the master and slave devices, and being enabled to calculate the range between itself and the slave devices based in the measured signal strength.

According to another aspect of the invention there is provided a wireless short range radio-frequency master device for determining the positions of one or more wireless short range radio-frequency slave devices relative to the master device, wherein the master device is configured to assess the strength of the radio signal between itself and a slave device at a plurality of orientations, thereby enabling a determination of the relative position of the slave devices with respect to the master device based on the relative signal strengths at different orientations.

According to a further aspect of the invention there is provided a method for determining the bearing of one or more wireless short range radio-frequency slave devices, comprising the master device and one or more slave devices, the method comprising the steps of the master device assessing the strength of the radio signal between itself and a slave device at an initial orientation, the master device being rotated to one or more secondary orientations with respect to the initial orientation and assessment of the strength of the radio signal between itself and a slave device at each of the secondary orientations, determining the bearing of the slave devices based on a comparison of the radio signal strengths at the initial and secondary orientations.

Preferably wherein the signal strength is determined by a combination of a combination of one or more of the following; a measure of the strength of the master transmitted signal as received by a slave device, a ratio of the strength of the signal received by the slave device to the strength of the signal transmitted by the master device, a ratio of the strength of the signal received by the master device to the strength of the signal transmitted by the slave device, a determination of the threshold of detection of a slave device by variation of the strength of the master transmitter signal, a determination of the path loss rate as decibel loss of signal strength between the master and slave devices, a determination of the bit error rate by measure of number of packets of data lost between the master device and a slave device, a calibration of the change in signal strength received by a slave device due to a change in the separation between the master and slave devices, by measurement of the strength of the signal received by the slave device from the master device at one or more known separations from the master device, a calibration of the slave device transmitter and receiver by querying the device for manufacturer information, comparing the response to a list of known previously calibrated devices.

There is also provided according to another aspect of the invention a system for determining the bearing of one or more wireless short range radio-frequency slave devices relative to a master wireless short range radio-frequency device, comprising a master device and one or more slave devices, the master device being configured to assess the strength of the radio signal between itself and a slave device at a plurality of orientations, the master device being enabled to determine the relative position of the slave devices with respect to the master device based on a comparison of the signal strengths at different orientations.

Further aspects and/or features of the invention are further set out in the other appended claims.

BRIEF DESCRIPTION OF THE DRAWINGS

Further aspects, features and advantages of the invention will be apparent from the following description of preferred embodiments, presented by way of example only, and by reference to accompanying drawings wherein:—

DESCRIPTION OF THE EMBODIMENT

Figure 1:
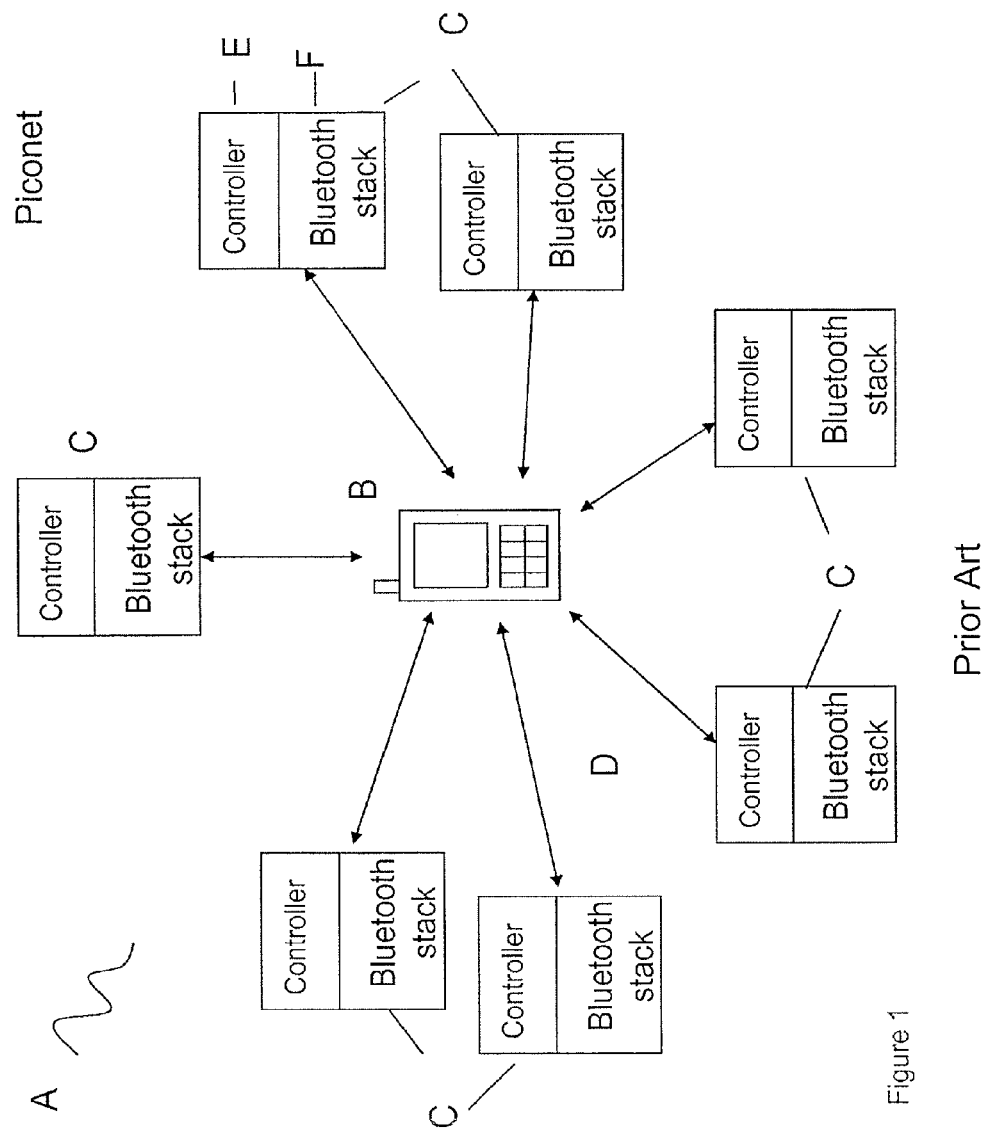
FIG. 1 is an example of a piconet, in the prior art.
Figure 2:
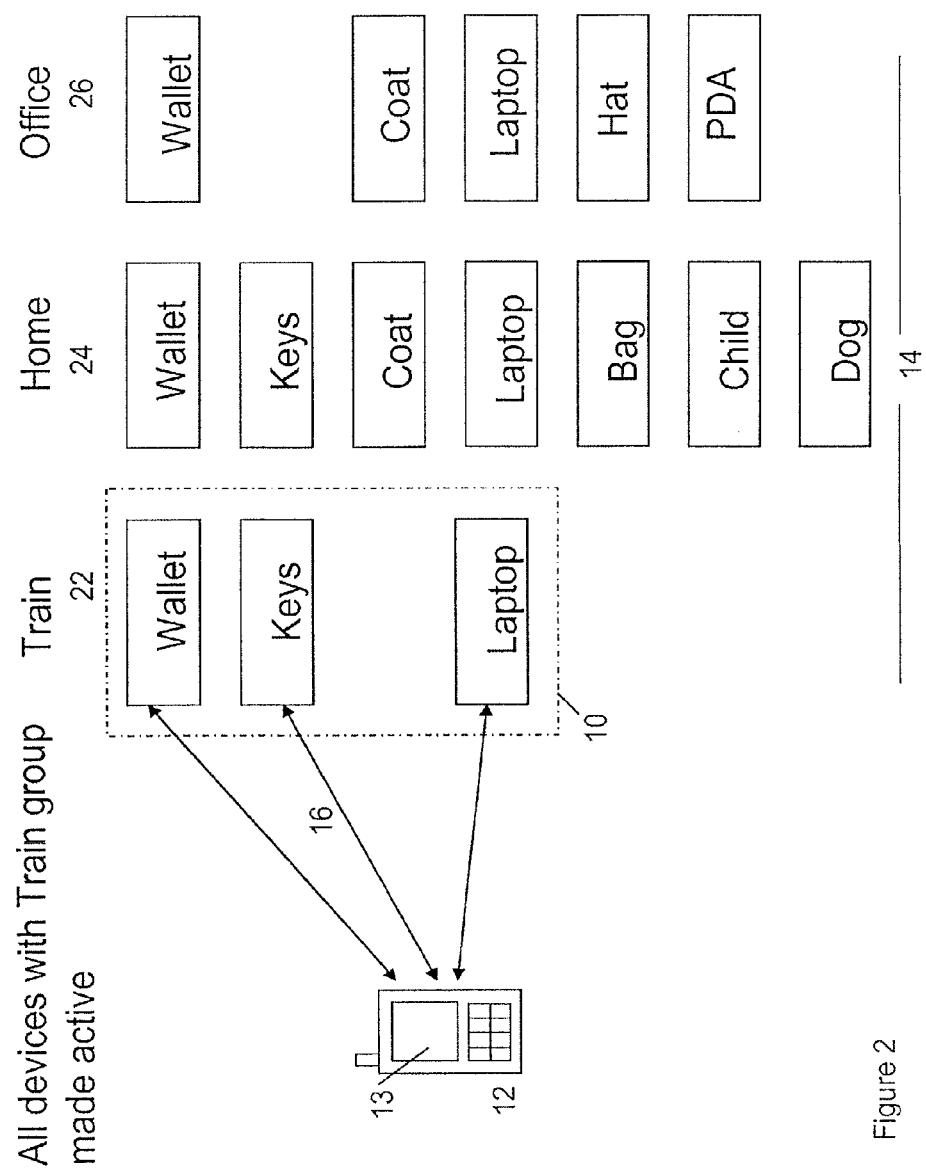
FIG. 2 is an example of a master device, with several slave devices that are assigned to groups and a user selected group of active slave devices that form a piconet.

FIG. 2 shows an example of the grouping of slave devices 14 and activation of a group of slave devices 14 to form a piconet 10 in the preferred embodiment. There is shown the master device 12, the slave devices 14, which are known to the master device 12 through known Bluetooth standard detection techniques, the slave devices 14 are registered in three groups, train 22, home 24 and office 26, the active devices that form the piconet 10 and the transfer of data 16 between the master device 12 and the devices in the piconet 10. The devices that form the train group 22, wallet, keys and laptop are active and form the piconet 10. All three items are also multiply defined, with all three items in the home group 24 and the wallet and the laptop in the office group 26. The remaining items in the home group 24 and office group 26 are inactive and do not form part of the piconet 10. The master device 12 in the preferred embodiment is a mobile telecommunications device comprising an antenna and controller adapted to communicate with local devices using the Bluetooth standard. Beneficially, such a master device 12 comprises a display 13 and other user interface elements such as a keypad to enable a user to interact with the master device 12.

In the preferred embodiment the master device 12 is enabled to allow a user to select which slave devices 14 or group of devices 22, 24, 26 form a piconet 10. In the example in FIG. 2 a user has activated the train group 22. The master device 12 therefore only transmits and receives data 16 from the slave devices 14 in the train group 22. The user may for example, deactivate the train group 22 and activate the office group 26, in this case the piconet 10 would consist of slave devices 14 called wallet, coat, laptop, hat and PDA. In the preferred embodiment up to a hundred different slave devices 14 may be registered to the master device 12, though in other embodiments more slave devices 14 may be registered, but only a maximum of seven may be active at any one time.

Figure 2A:
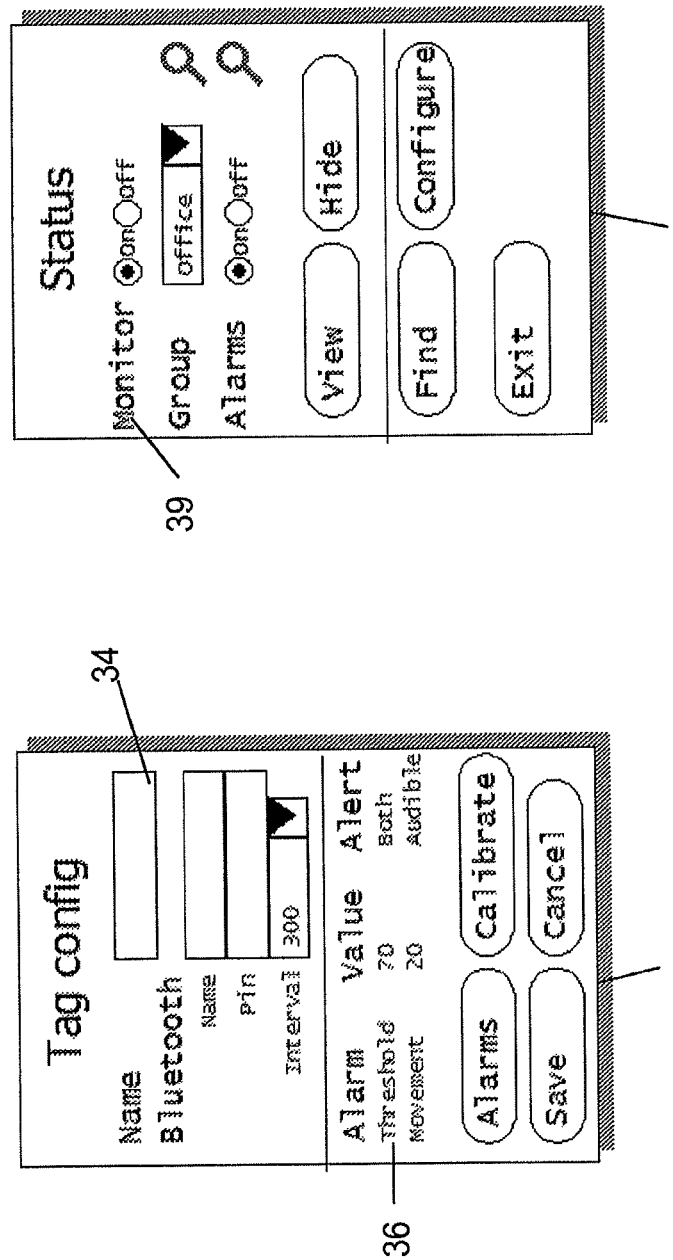
FIG. 2a is an example of a display of the preferred embodiment allowing a user to select the group of slave devices to form a piconet.

FIG. 2a shows an example of an interface of the preferred embodiment that allows a user to register a slave device 14 and to activate a group of slave devices 14 to form a piconet 10. There is shown an example of a registration screen 32 and a group status screen 38. In the preferred embodiment both screens would be shown on the display 13 of the standard mobile telecommunications device and any user inputs would occur by known means such as, but not limited to, keypad input, touch screen recognition, voice recognition etc. The skilled person would understand that the interface is not limited to be shown on the display 13 of a standard mobile telecommunications device but may be on other forms of display and that the screens shown are examples and that other features may be displayed. The registration screen 32 is enabled to allow a user to name a slave device 14 in input field 34 and assign a sensitivity and alarm type 36 for the slave device 14. The sensitivity and alarm type 36 of the slave device 14 allows the user to personalize the monitoring of each slave device 14. A device which is not expected to be moved may be assigned a high sensitivity. The alarm type 36 may indicate what type of monitoring occurs, for example an alarm classified as Absent is triggered when the slave device 14 goes out of range of the master device 12, Threshold is triggered when the signal received by the slave device 14 drops below a given value, Motion is triggered when the difference between the previous sample and the current one exceeds a value. The group status screen 38 is enabled to allow a user select the monitoring status of the group 39, which would form the piconet 10.

Figure 3:
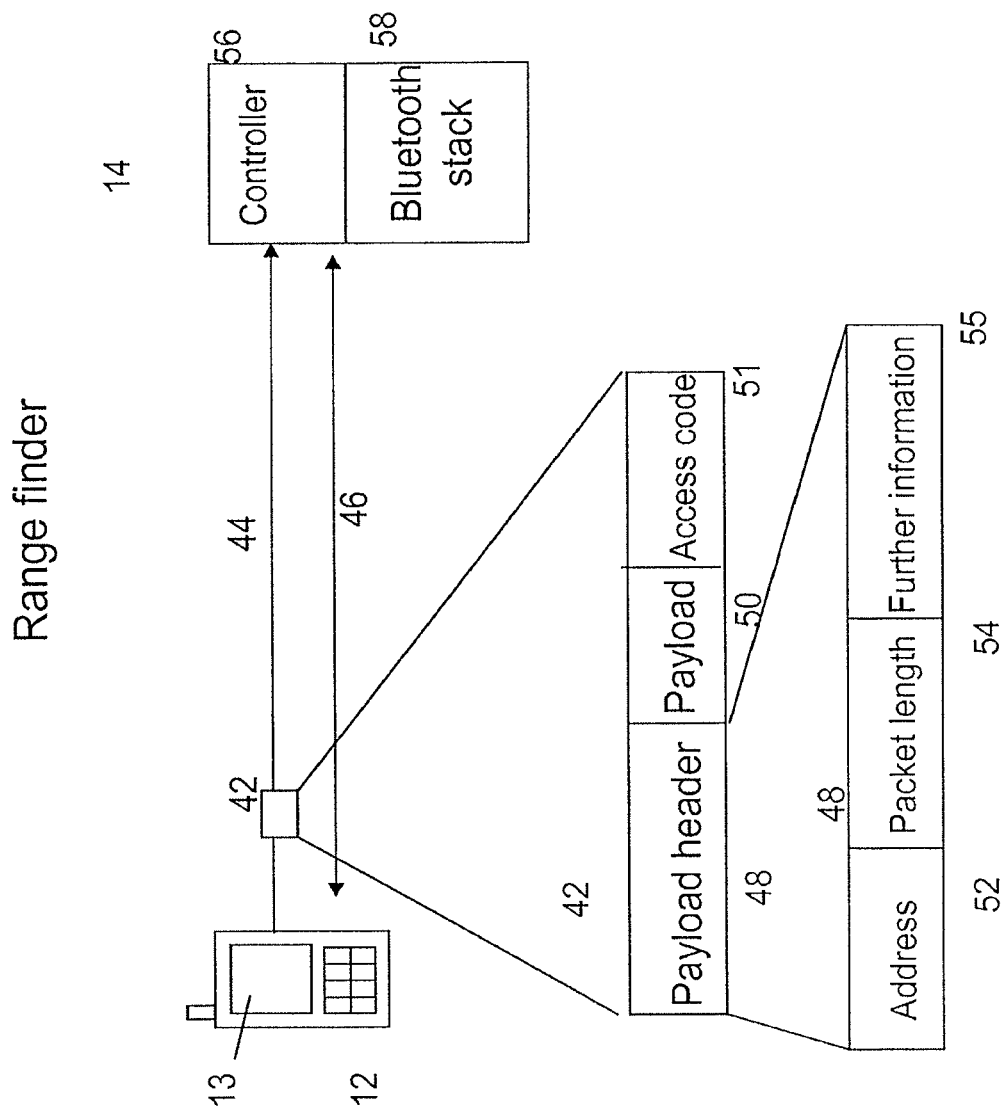
FIG. 3 is an example of the process of the transmission of a packet of data between a master and slave device to determine the separation between the devices.

Referring to FIG. 3 once a piconet 10 has been formed, the master device 12 monitors the separation 46 of the active slave devices 14 that form the piconet 10 with respect to the master device 12. FIG. 3 is a representation of the process of a master device 12 querying a slave device 14 in order to calculate the separation 46 between the devices. There is shown the master device 12, the slave device 14, a packet of data 42 sent from the master device 12 to the slave device 14, the transfer of data between the master device to the slave device 44 and the separation of the master device and slave device 46. The packet of data 42, comprises a payload header 48, the payload 50 and access code 51, the payload header 48 comprises an address 52, the packet length 54 and further information 55 as determined by the Bluetooth standard. The slave device 14 comprises a controller 56 and a Bluetooth stack 58. The Bluetooth standards define the protocols for transmitting data between devices but do not define a standard for assessing proximity and there is no single calculation to determine the separation 46 between any two devices. The invention in the preferred embodiment therefore defines a measured proximity (mProx) which is dependant on the hardware of the devices which may be converted to an absolute value, the calculated proximity (cProx). The calculated proximity is defined as cProx=normalise(damping (mProx)), and the calculation of the normalisation factor, damping and measured proximity are described below. Damping is used to correct for variations in the signal strength due to factors such as interference of the transfer of data 44, frequency hopping, reflections etc. The damping algorithm observes the historical sequence of values and assesses whether the current value is a genuine change or a spurious result. In a preferred embodiment the damping algorithm is one that is known in the art for oscillating systems such as those found in amplifiers. The algorithm calculates a mean and standard deviation values from the historical data and applies these values as a multiplier to the most recent measured value of signal strength. In further embodiments other suitable known methods for calculating the damping of the signal may be used.

Spurious results are damped out in the calculation, but retained in the historical data, since the damping decision may be subsequently revised. In the preferred embodiment, normalizing takes the result of damping and attempts to match it to a ten point proximity scale. Preferably, the user has performed a calibration of the master device 12 and each of the slave devices 14. To calibrate the master device 12 and a slave device 14, the user separates the master device 12 and slave device 14 device by a predetermined distance and measures the signal strength received by the slave device 14 at the known separation 46. The strength of the signal received at the known separations and at the known transmission strengths, as used to calibrate the normalisation of the signal. As the fall-off of the signal strength is non-linear, a ten point scale to model the fall-off of signal strength with distance is calculated and used as the normalisation function. A mathematical curve is fitted to the data points to allow the interpolation of other values. Though others means for modelling the loss of signal strength with distance may be used.

The measured proximity is calculated using the properties of the packets of data 42 transferred between the master device 12 and the slave device 14. Each packet of data 42, comprises a payload header 48, the payload 50 and access code 51. The payload header 48 contains information regarding the payload 50, including packet length 54 and the address 52 of the slave device the packet is being sent to and further information 55 as determined by the Bluetooth standard. From the information contained in the payload header 48, a comparison of the strength of the signal received by the slave device 14 to the strength of the signal transmitted can be made and therefore an estimate of the separation 46 made. In the preferred embodiment seven base algorithms to determine the separation are available. Each is based upon a different measurable parameter. These algorithms are used in different combinations with each other to calculate a value for mProx. This compensates for hardware differences and variations consequent upon the power saving strategies used by different Bluetooth devices. The base algorithms used are shown below, but it is understood that a person skilled in the art may use other valid algorithms to provide a measure of the signal strength and therefore device proximity.

a) Contact error—detection of whether the slave device 14 is in response range of the master device 12, thereby providing a limit of the distance of separation 46 between the master device 12 and slave device 14.
 b) Received signal strength—Calculation based upon the strength of signal received by the slave device 14. The Bluetooth standards define optimum signal strength, known as the 'Golden Range'. The chipset returns a value of 0 if the signal is within this range, otherwise it returns an integer indicating (in dB) the distance above or below the range that the signal lies.
c) Path loss—The further information 55 in the payload header 48, may be configured to contain the transmission strength of the signal. A comparison of the transmission strength of the signal to the strength of the signal received at the Bluetooth stack 58, gives a measure of the signal strength lost along the path 44.
d) Master power ramping—Power on the master transmitter is varied and used with any of the above calculations to calculate the measured proximity at various transmitter powers to refine the value of mProx.
e) Data contact error—By decreasing the power of the transmitter of the master device 12, a determination of the threshold of the signal strength required for the slave device 14 to cease receiving packets of data 42 from the master to the slave can be made.
f) Data frame error—It is known to calculate the frame error rate in a packet of data 42. By calculating the blocks of data in the payload 50 lost in a single packet of data 42 due to framing errors, a frame error for each packet of data 42 may be calculated. This method is further refined by varying the signal strength sent by the master device 12, and calculating the frame error for each transmitter signal strength.
g) Data bit error—It is known to calculate the error rate in a packet of data 42 as received by a slave device 14. Information stored in the payload header 48, may include the packet length 54 transmitted, an error rate may be determined by a comparison of the packet length received by the slave device 14, with the packet length transmitted, which would be stored in the payload header 54. Other methods for determining the error rate such as cyclic redundancy check, may be used to provide a measure of the error rate. By calculating the bit error rate at different settings of the transmitter of the master device 12 a measure of the proximity can be made.

Figure 4:
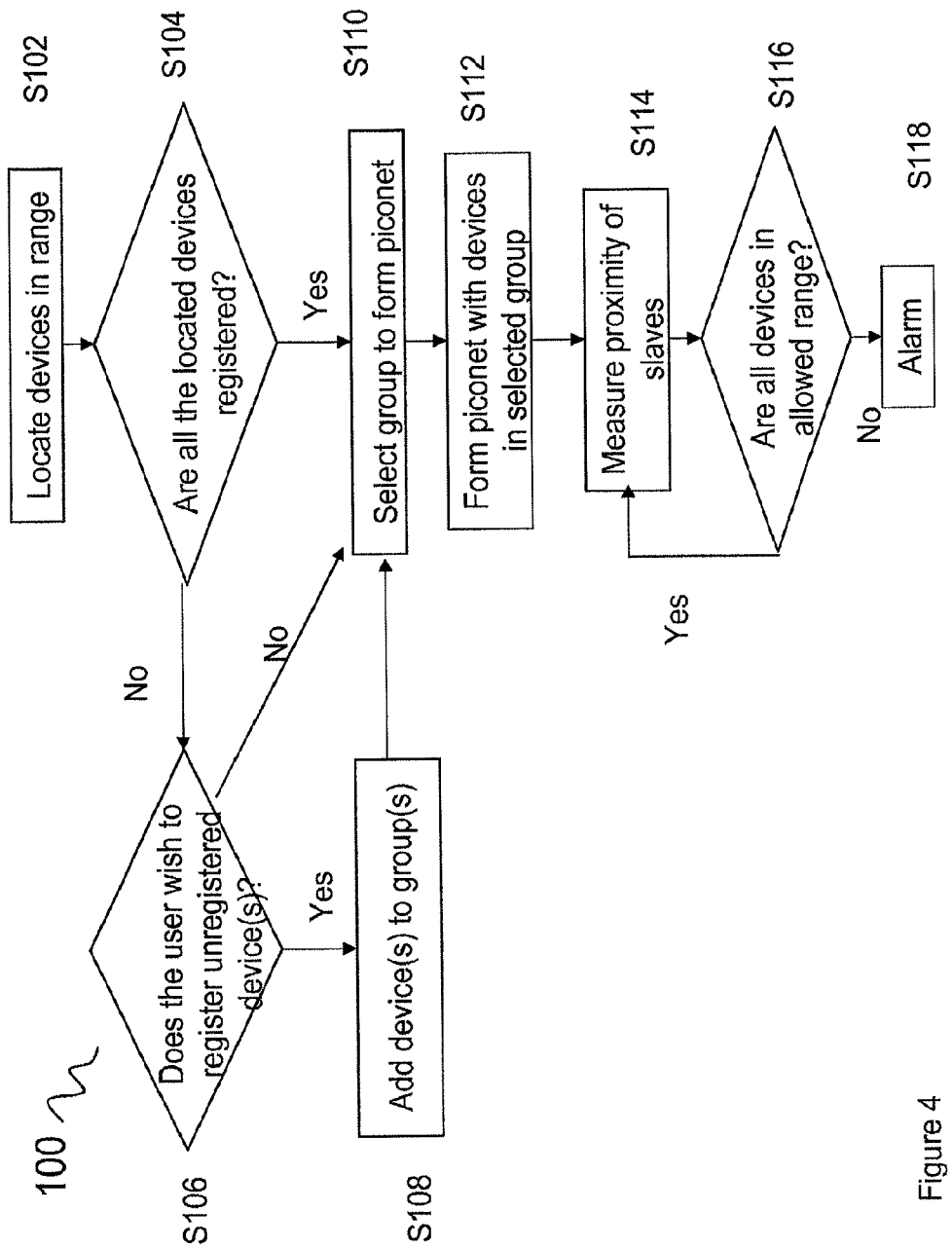
FIG. 4 is a flow diagram representing the steps of the formation of a user defined group, the selection of a user defined group to form a piconet, and monitoring of the devices that form the piconet.

FIG. 4 is a flow diagram of the process 100 of the registration of slave devices 14, formation of a piconet 10 and monitoring of the slave devices 14 that form the piconet 10. All Bluetooth devices in range of the master device 12 are detected, using known protocols as defined by the Bluetooth standard at step S102. Each detected device is checked to see if it is registered with the master device 12 at step S104, if an unregistered device is detected, the user is queried as to whether the user wishes to register the slave device 14 at step S106. If the user wishes to register the slave device 14, the user is presented with the registration screen 32, where the user is able to add the device to one or more groups at step S108. The user selects which group they wish to activate and monitor at step S110 using the group status screen 38 thereby activating the slave devices 14 to create the piconet 10 at step S112. The master device 12 monitors the slave devices 14 that form the piconet 10 by measuring their separation 46 from the master device 12 at step S114. Determination of the separation 46 of the master device 12 and the slave device 14 occurs as described above. The separations are assessed at step S116, to ensure that all active slave devices 14 that form the piconet 10 are within a predetermined user defined range. If one or more slave devices 14 are outside of the predetermined range, or undetectable by the master device 12 the user is notified at step S118. Notification, in the preferred embodiment is via an audible alarm, though other means such as a visual alarm on the display 13, text message to the user etc. may be used.

Figure 5:
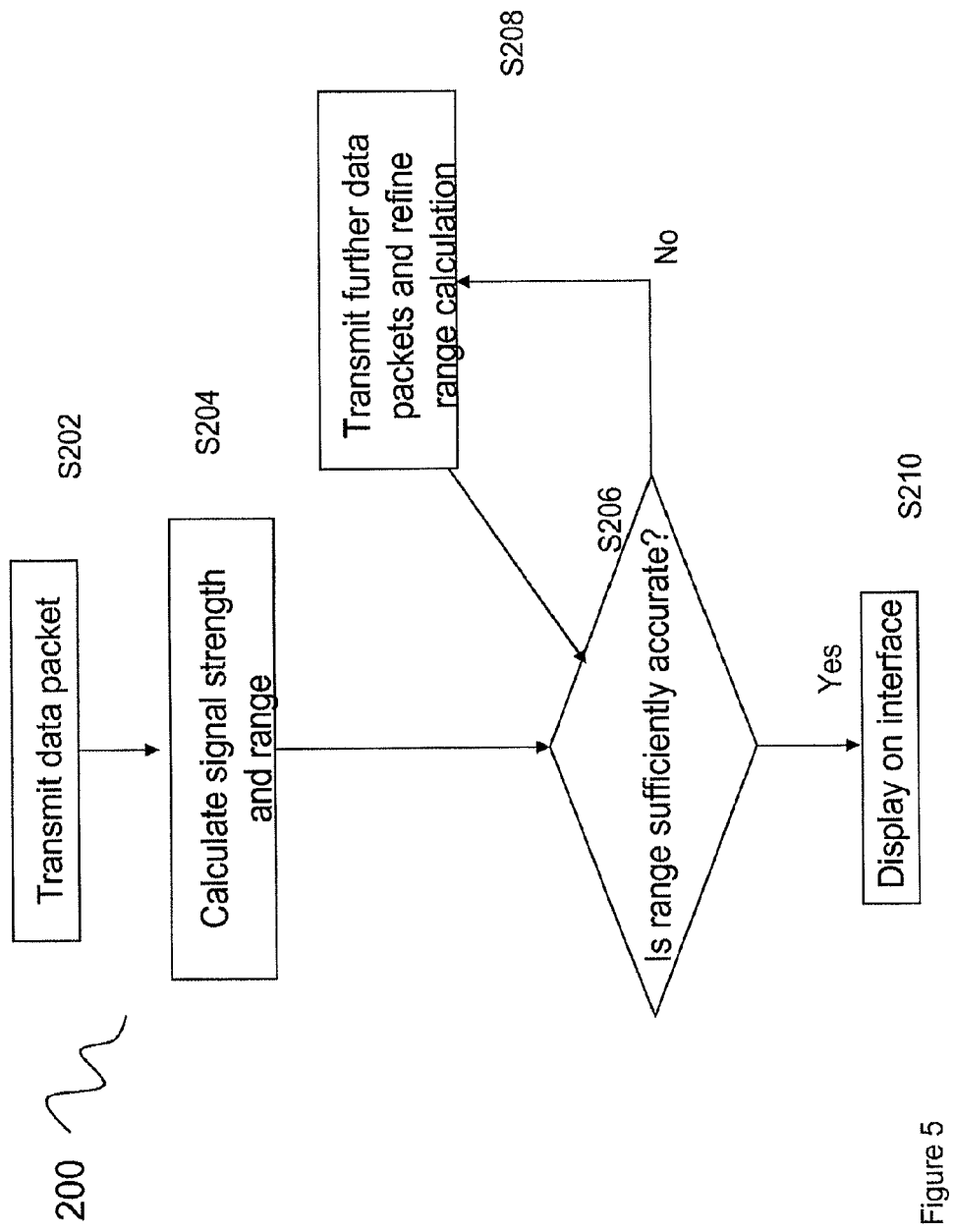
FIG. 5 is a flow diagram outlining the steps for calculating the separation between the master and a slave device.

FIG. 5 is a flow diagram of the process 200 to determine the separation 46 of a slave device 14 from the master device 12. A packet of data 42 is transmitted from the master device 12 to the slave device 14 at step S202. The calculations of the measure proximity and separation 46 between the devices using the methods as described above are made at step S204. The person skilled in the art would appreciate that any such a calculation of the separation would also return a measure of the error in the calculation. In a preferred embodiment the signal strength and error measures detected received from the hardware will have a tolerance which can either be determined directly from the chipset in the master device 12 or assigned as part of the calibration process of a given device as described above with reference to FIG. 3. This is preferably expressed as a percentage +/− variation in the actual value. These tolerances are preferably combined for use in the proximity calculation, and the errors from the calculation are preferably combined with the tolerances to determine a percentage error range for the resulting value. In further embodiments other known suitable methods for calculating the size of the error based on the strength of the signal received and method of calculation are used. Those skilled in the art will understand that the error determination is largely based on the method and hardware used in the embodiment. The size of the error would be queried at step S206 and if it is above a pre-determined tolerance then further calculations of the separation 46 are made at step S208 until such a time that the error is within an acceptable limit. The separation 46 may be refined using the same or a different method than in step S204. The calculated separation 46 may then be displayed at step S210 on the display 13, for example on the interface 70 shown in FIG. 8.

Figure 6:
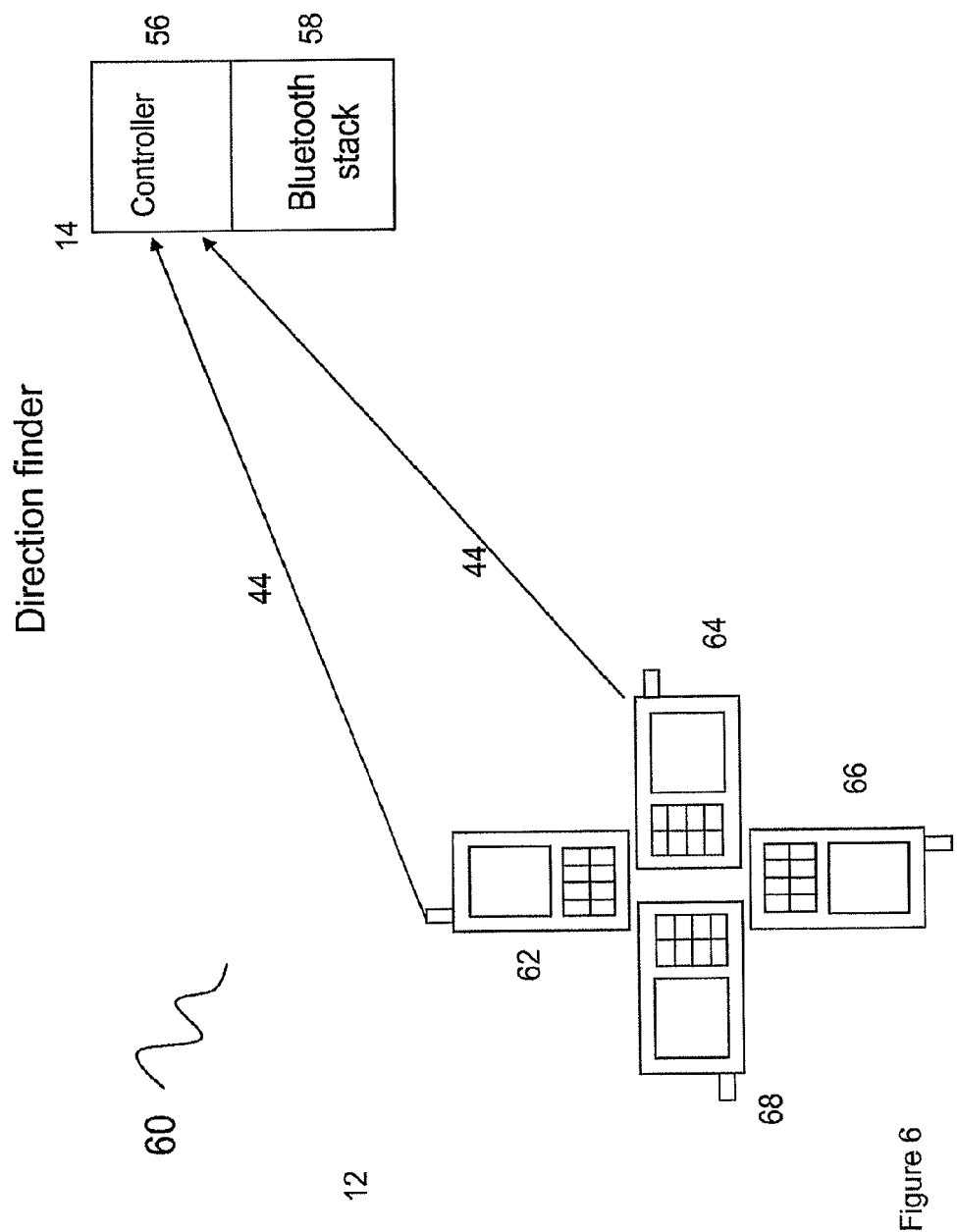
FIG. 6 is a representation of the process of determining the location of a slave device by measurement of the signal strength at different orientations of the master device.

FIG. 6 is a representation of the method 60 used to determine the bearing of a slave device 14 with respect to the master device 12. There is shown the master device 12, at an initial orientation 62, at secondary orientations 64, 66, 68 and the slave device 14, which comprises the controller 56 and the Bluetooth stack 58. Data is transmitted from the master device 12 to the slave device 14. The master device 12 is at an initial orientation 62 and a calculation of the signal strength is made. The signal strength is calculated using one or more of the methods described above, though other methods for calculating the signal strength are acceptable. In the preferred embodiment the master device 12 is rotated through 90 degrees to a secondary orientation 64 and the signal strength is calculated at this secondary orientation 64. Once the signal strength has been calculated the master device 12 is further rotated to secondary orientations 66 and 68, and the signal strength calculated at each of these orientations. The bearing of the slave device 14 with respect to the initial orientation 62 of the master device 12 is given by Bearing=arctan((s.o.s 64−s.o.s 68)/(s.o.s 62−s.o.s 66)) where s.o.s is the strength of the signal at the orientations shown in FIG. 6. The person skilled in the art will appreciate that this method may be adapted to incorporate any number of orientations greater than one, and that the differences between distinct orientations need not be 90 degrees.

Figure 7:
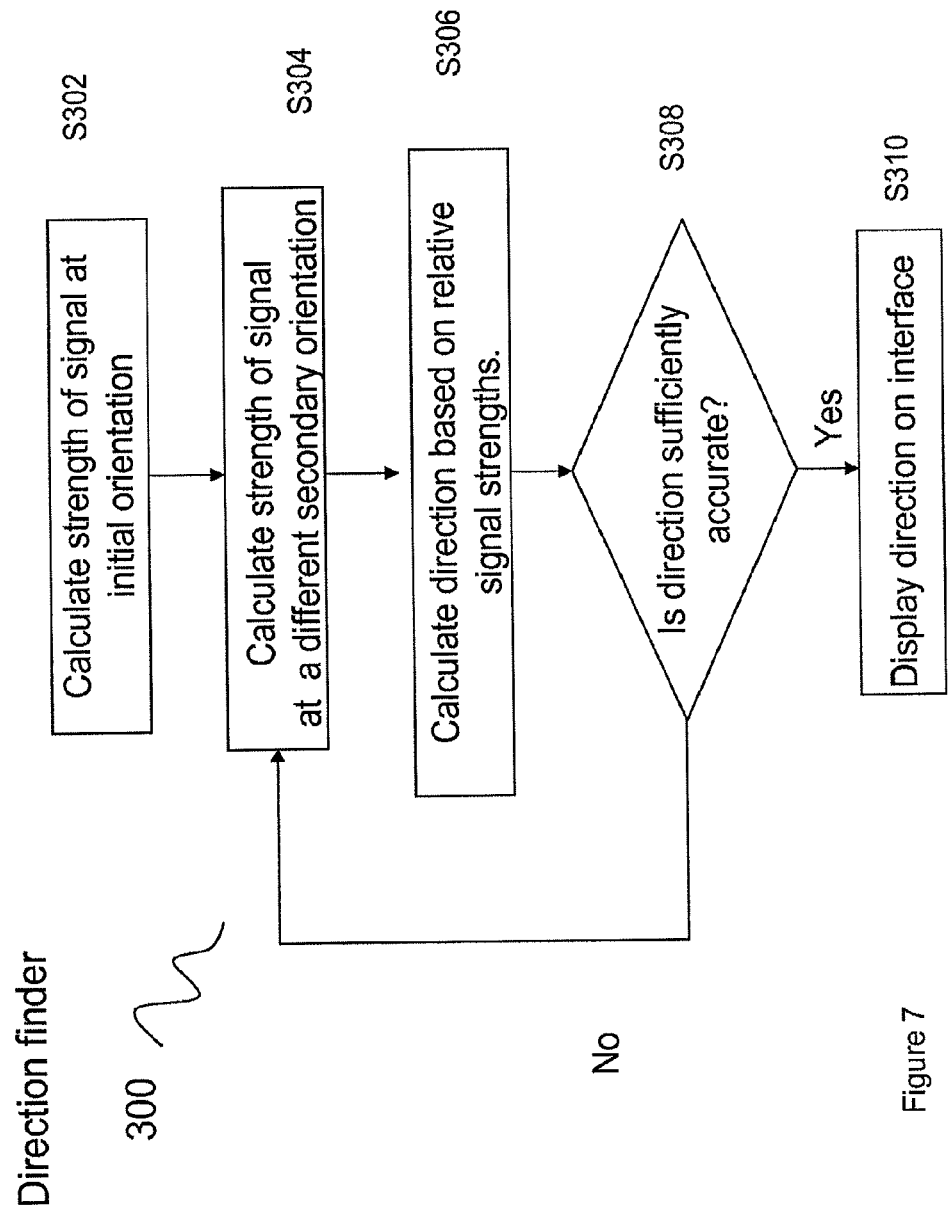
FIG. 7 is a flow diagram representing the steps of determining the bearing of a slave device by measurement of the signal strength at different orientations of the master device.

FIG. 7 is a flow diagram of the process 300 used to determine the bearing of a slave device 14 with respect to the initial orientation 62 of the master device 12. The calculation of the strength of the signal occurs at step S302. The master device 12 is rotated to a secondary orientation and the signal strength at the secondary orientation is calculated at step S304. A comparison of the signal strengths at the different orientations is made at step S306 and a bearing determined. The person skilled in the art would appreciate that any such calculation of the bearing would be subject to an error. The calculation of the error is preferably calculated by the same method as for calculating the error in the distance as described above with reference to FIG. 5, though other methods of error calculation may be used. The size of the error is queried at step S308 and if the error is above a pre-determined tolerance then the master device 12 is rotated to another distinct secondary orientation and the signal strength is assessed at step S304. The process continues until such a time that the bearing calculated is of the desired accuracy. In the preferred embodiment the calculated bearing is displayed on the display 13 of the master device 12, at step S310.

Figure 8:
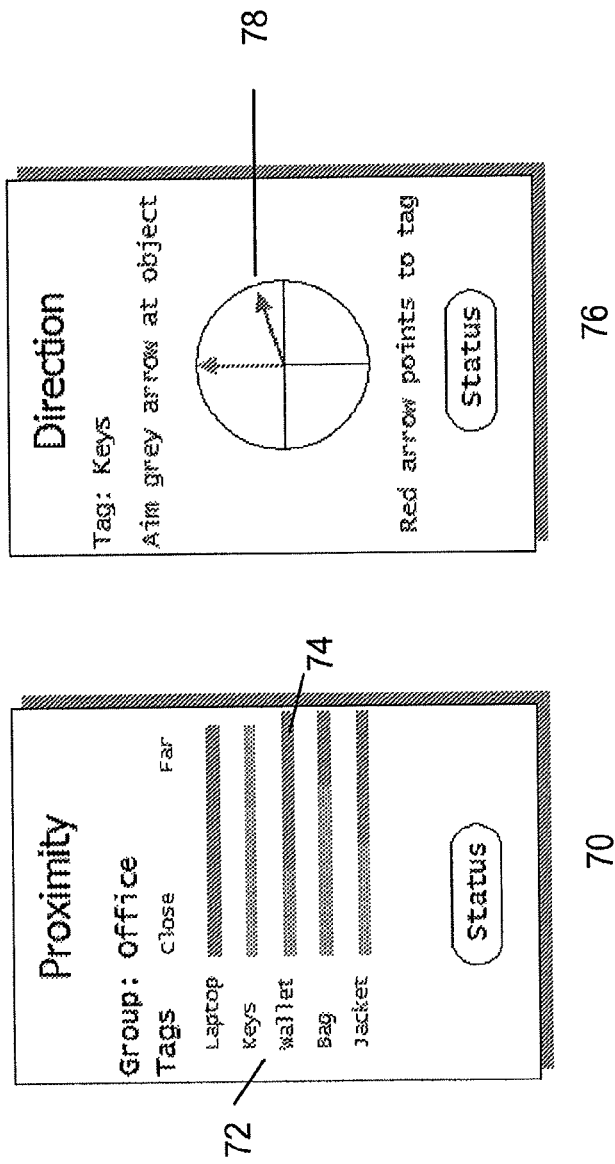
FIG. 8 is an example of a display in the preferred embodiment of a master device showing the bearing and separation of a slave device with respect to the master device.

FIG. 8 shows an example of the user interface screen that would be shown on the master device 12. There is shown the separation measure screen 70, with the active tags 72 and an indicator showing their separation from the master device 74. There is also shown, a direction indicator screen 76, with an arrow 78 indicating the bearing of a slave device 14 with respect to the initial orientation 62 of the master device 12. In other embodiments the separation 46 may be represented to the user by an audible indicator, such as an alarm which varies in volume dependent on the separation between the master device 12 and the slave device 14, or the size of the arrow 78 may also be used to indicate the separation 46 between the master device 12 and the slave device 14.

Whilst the above embodiments have been described in the context of their application for use in a mobile telecommunications device for which the invention is particularly advantageous, embodiments of the invention may be applied in any system that is Bluetooth enabled. Furthermore, a person skilled in the art would be aware that the above embodiment would also be applicable to a scatternet, where a slave device 14 may simultaneously be a master device 12 for another piconet 10, thereby allowing the monitoring of more than seven active slave devices 14.

The invention claimed is:

1. A wireless short range radio frequency master device configured to:
   receive at a plurality of orientations of the master device a plurality of radio signals from at least one slave device, wherein the plurality of radio signals are transmitted using variable strengths;
   assess a strength of radio signals of the plurality of radio signals received in the plurality of orientations of the master device;
   determine from differences in the strength of the radio signals received at the plurality of orientations of the master device, a direction of the at least one slave device relative to the master device; and
   wherein the direction of the at least one slave device relative to the master device is other than the direction associated with any of the plurality of orientations of the master device used to assess the strength of the radio signals.

2. A method for determining a direction of at least one wireless short range radio-frequency slave device relative to a master device, the method comprising:
   receiving a plurality of radio signals from at least one slave device, wherein the plurality of radio signals are transmitted using variable strengths;
   assessing a strength of radio signals received by the master device positioned at an initial orientation;
   rotating the master device to one or more secondary orientations with respect to the initial orientation and assessing the strength of radio signals received by the master device positioned at each of the one or more secondary orientations; and
   determining from differences in the strength of the radio signals at the initial orientation and at the one or more secondary orientations a direction of the at least one slave device relative to the master device; and
   wherein the direction of the at least one slave device relative to the master device is other than a direction associated with any of the initial and secondary orientations used to assess the strength of the radio signals.

3. The method of claim 2 wherein a number of distinct orientations is four and an angle of rotation between each orientation is approximately 90 degrees.

4. The method of claim 2 wherein the strength of the radio signals is determined by a combination of one or more of the following:
   a measure of a strength of a signal transmitted by the master device as required by the at least one slave device;
   a ratio of the strength of the signal received by the at least one slave device to the strength of the signal transmitted by the master device;
   a ratio of a strength of a signal received by the master device to the strength of the signal transmitted by the at least one slave device;
   a determination of a threshold of detection of a slave device by a variation of the strength of the master transmitter signal;
   a determination of a path loss rate as decibel loss of signal strength between the master and the at least one slave device;
   a determination of a bit error rate by measuring a number of packets of data lost between the master device and the at least one slave device;
   a calibration of a change in signal strength received by the at least one slave device due to a change in a distance between the master and the at least one slave device, by a measurement of a strength of the signal received by the at least one slave device from the master device at one or more known distances from the master device; and
   a calibration of a slave device transmitter and receiver by querying the slave device for manufacturer information and comparing a query response to a list of known previously calibrated devices.

5. The method of claim 2 further comprising:
   determining an error associated with the received signal strength;
   comparing the determined error with a predefined value;
   when the error exceeds the predefined value, measuring additional radio signals from the at least one slave device; and
   reassessing a strength of the additional radio signals until the determined error becomes less than the predefined value.

6. A non-transitory computer-readable medium encoded with a computer program comprising instructions which, when implemented, enable a determination of the direction on the at least one slave device relative to the master device according to the method of claim 2.

7. The method of claim 2, wherein receiving includes receiving a plurality of signals from at least two slave devices.

8. The method of claim 2, further comprising:
   repeating steps of rotating the master device and assessing the strength of radio signals until the direction is determined in a desired accuracy.

9. A system for creation and maintaining a portable private network of wireless short range radio-frequency devices comprising a master device and at least two slave devices that are enabled to form a portable private network when activated by the master device, wherein the master device is configured to:
   receive at a plurality of orientations of the master device a plurality of radio signals from the at least two slave devices, wherein the plurality of radio signals are transmitted using variable strengths;
assess a strength of radio signals received by the master device;
determine from differences in the strength of the radio signals received at the plurality of orientations of the master device a direction of each of the at least two slave devices relative to the master device; and
wherein the direction of each of the at least two slave devices relative to the master device is other than a direction associated with any of the plurality of orientations of the master device used to assess the strength of the radio signals.

* * * * *

UNITED STATES PATENT AND TRADEMARK OFFICE
CERTIFICATE OF CORRECTION

| | | |
|---|---|---|
| PATENT NO. | : 8,929,821 B2 | Page 1 of 1 |
| APPLICATION NO. | : 13/600175 | |
| DATED | : January 6, 2015 | |
| INVENTOR(S) | : Mark Elsom-cook and Steve P Morris | |

It is certified that error appears in the above-identified patent and that said Letters Patent is hereby corrected as shown below:

The first paragraph at the beginning of the specification, Column 1, lines 3-12, should read:

CROSS-REFERENCE TO RELATED APPLICATIONS

This application is a continuation of U.S. Application No. 12/989,218, filed January 7, 2011, which claims the benefit of PCT/GB2009/050411, filed April 22, 2009, which is an international (PCT) application that claims the benefit of U.K. Application No. 0807436.1 filed April 23, 2008, now U.K. Patent No. GB 2472547, all of which are incorporated herein by reference in their entireties.

Signed and Sealed this
Twenty-first Day of July, 2015

Michelle K. Lee
*Director of the United States Patent and Trademark Office*